(12) United States Patent
Fitzgerald (10) Patent No.: US 12,183,563 B2
(45) Date of Patent: Dec. 31, 2024

(54) ELECTRIC POWER SOURCE EMPLOYING FIELD EMISSION

(71) Applicant: David Fitzgerald, Marietta, OH (US)

(72) Inventor: David Fitzgerald, Marietta, OH (US)

( * ) Notice: Subject to any disclaimer, the term of this patent is extended or adjusted under 35 U.S.C. 154(b) by 828 days.

(21) Appl. No.: 16/699,764

(22) Filed: Dec. 2, 2019

(65) Prior Publication Data

US 2021/0166926 A1 Jun. 3, 2021

(51) Int. Cl.
*H01J 45/00* (2006.01)
*F25B 21/00* (2006.01)
*G21D 7/04* (2006.01)
*H02N 3/00* (2006.01)

(52) U.S. Cl.
CPC .............. *H01J 45/00* (2013.01); *F25B 21/00* (2013.01); *G21D 7/04* (2013.01); *H02N 3/00* (2013.01); *F25B 2321/001* (2013.01)

(58) Field of Classification Search
CPC ..... H01J 45/00; F25B 21/00; F25B 2321/001; G21D 7/04; H02N 3/00; Y02E 30/00
See application file for complete search history.

(56) References Cited

U.S. PATENT DOCUMENTS 4,280,074 A * 7/1981 Bell ................... H02N 3/00
310/306
5,696,028 A * 12/1997 Rolfson ........... H01L 21/31053
445/24
11,004,666 B2 * 5/2021 Choi ...................... H01J 45/00
11,205,554 B1 * 12/2021 Riley ..................... H01J 1/15
2015/0243867 A1 * 8/2015 Geballe ................ H10N 10/81
136/205

OTHER PUBLICATIONS

Go, et al., Thermionic Energy Conversion in the Twenty-first Century: Advances and Opportunities for Space . . . , Article, Nov. 8, 2017, 1-44, 3-2017, Frontiers, United Kingdom.
Lee, et al., Optimal emitter-collector gap for thermoinic energy converters, Article, Apr. 27, 2012, 1-5, 100-173904, American Institute of Physics.

* cited by examiner

*Primary Examiner* — Ana M Vazquez
(74) *Attorney, Agent, or Firm* — Frank H. Foster; Kremblas & Foster (57) ABSTRACT

An electric power source in which an electron collector and an electron emitter, having a higher work function than the electron collector, are connected peripherally by a wire and placed very close together. An electric potential difference develops between the electron collector and the electron emitter as electrons spontaneously flow through the wire from the electron collector to the electron emitter due to the difference in work functions. With the electron collector and electron emitter positioned extremely close together, the small electric potential difference creates a strong electric field. The strong electric field allows field emission of electrons from the electron emitter. The emitted electrons then cross the small gap to the electron collector, completing the electric circuit, allowing a continuous electric current to flow, making this device an electric power source.

11 Claims, 5 Drawing Sheets

ELECTRIC POWER SOURCE EMPLOYING FIELD EMISSION

CROSS-REFERENCE TO RELATED APPLICATIONS

Provisional Patent application for ELECTRIC POWER SOURCE WITH FIELD EMISSION, Filing Date Oct. 9, 2019 and
Provisional Patent application for THERMIONIC CONVERTER WITH FIELD EMISSION, Filing Date Dec. 3, 2018.

FEDERALLY SPONSORED RESEARCH

NONE

SEQUENCE LISTING

None

BACKGROUND OF THE INVENTION

This disclosure relates generally to an apparatus for generating electric power and more specifically to such an apparatus that produces electric power using heat from the environment as an energy source and employs electron field emission to complete an electric circuit.

This disclosure makes use of an attribute of conductors and semiconductors known as work function. Free electrons within a conductor or semiconductor material are held inside the material by an electric field barrier at the surface. Work function is most generally thought of as the amount of energy that a free electron within a material must be given so that it has enough kinetic energy to pass through the barrier and escape to the outside (see e.g. John D. McGervey in "Modern Physics", 1971, page 72). Work function is usually expressed in electron volts.

The voltage that drives an electric current in this disclosure arises spontaneously when a low work function material and a higher work function material are connected by a wire. Electrons will flow from the low work function material to the higher work function material.

In this disclosure, electron field emission allows a current of electrons to cross a small gap between electrodes in order to complete a circuit. Electron field emission is quantum mechanical in nature and happens when a strong electric field is created at a material's surface and is oriented so as to pull on electrons near the surface, making the naturally occurring electric field barrier at the surface much thinner. Electrons can then tunnel through the thin surface barrier and move out of the material without being given kinetic energy equal to the work function in order to push through the barrier (see e.g. A. J. Dekker in "Solid State Physics", 1959, pages 220 and 227).

DESCRIPTION OF THE RELATED ART

This disclosure is similar in many ways to a type of thermionic energy converter that operates with a high temperature source of heat. In both, potential energy brought about because of a difference in work functions between two materials drives an electric current. This potential energy is responsible for the contact potential difference or Volta potential that occurs when different conductor or semiconductor materials are brought into contact or are connected by a wire (see e.g. A. J. Dekker in "Solid State Physics" page 230).

The principle components of a high temperature thermionic energy converter are two electrodes that are made of different materials and are placed very close to each other. The materials that the two electrodes are made of have significantly different work functions. The two electrodes are connected peripherally by a wire. A source of heat is positioned near the higher work function electrode. The heat source should, in general, have a temperature above 1500 degrees K, (see e.g. David B. Go et al. in "Frontiers in Mechanical Engineering", 8 Nov. 2017, page 3). There are lower temperature thermionic converters that develop a voltage through a different mechanism (see e.g. Khalid et al. In "IEEE Transactions on Electron Devices", vol. 63, no. 6, June 2016, page 2232).

Without the heat source, there is an exchange of electrons through the wire in both directions between the lower work function electrode and the higher work function electrode in which the transfer of electrons is predominately from the lower to the higher work function electrode. As the electrons flow and a greater density of electrons gather in the higher work function electrode, an electric field arises that decreases the movement of electrons from the lower to the higher work function electrode and increases the electron flow from the higher to the lower work function electrode until an equilibrium is attained in which the electron flow in one direction equals the electron flow in the other direction. The difference in electric potential between the lower and the higher work function electrodes when the electron flow becomes equal is called the contact potential difference (see McGraw-Hill Dictionary of Scientific and Technical Terms, 6E, Copyright 2003).

With the heat source near the high work function electrode, even though the greater proportion of conduction electrons are moving through the wire from the lower work function electrode to higher work function electrode than in the other direction, an electric potential difference doesn't build up. Heat in the heated high work function electrode gives some electrons an amount of kinetic energy equal to or greater than the work function of the electrode material so that the electrons experience thermionic emission from the surface of the heated electrode into the space between the two electrodes.

The emitted electrons move across the small gap and enter the lower work function electrode completing an electric circuit. The electrons that have entered the lower work function electrode become part of the current of electrons that flows through the wire connecting the two electrodes and once again enter the higher work function electrode and once again are emitted. The higher work function electrode can be called the electron emitter and the lower work function electrode can be the electron collector. The current will flow as long as the heat source supplies energy to drive electrons out of the electron emitter.

As the current flows, electric power can be drawn by some device connected along the wire that links the two electrodes. The maximum voltage available depends on the difference in work functions between the electron collector and the electron emitter (see e.g. David B. Go et al. in "Frontiers in Mechanical Engineering", 8 Nov. 2017, page 3).

It may appear that the source of energy that allows a high temperature thermionic converter to operate as an electric power source is heat added to the electron emitter. That is not the case. The difference in work functions creates a voltage to drive the electric current. The added heat serves a different function.

As in other electric power generation cycles, such as the rankine cycle, the working fluid (conduction electrons in this case of this disclosure) that has performed useful work must have its entropy returned to a low level that can be considered the starting point of a thermodynamic cycle. The heat added to the electron emitter in a high temperature thermionic converter fulfills the entropy reduction requirement by releasing electrons from the electron emitter so that they become lower entropy electrons in the space between the electron emitter and the electron collector. In the disclosure, unlike a high temperature thermionic energy converter, the necessary release of electrons as an entropy reduction step takes place through electron field emission rather than thermionic emission.

As will be more fully explained in the description of the disclosure, the actual energy source for a high temperature thermionic converter is not a high temperature heat source. The energy is found when electrons move from one material to another material that is in physical contact. Electrons must gain or lose kinetic energy so that they possess a kinetic energy equal to the Fermi energy of the material they are entering. The electrons that cross a boundary between materials exchange energy with lattice ions at the interface between the two materials so that the lattice become cooler or warmer as the electrons lose or gain kinetic energy.

DESCRIPTION OF THE INVENTION

The device of this disclosure can be built using the techniques of micro and nano manufacturing that are used to build such devices as microprocessors and nanotubes. As in a high temperature thermionic energy converter, voltage in the present invention is produced due to a difference in work function between two different materials.

In the present disclosure, a lower work function electrode and a higher work function electrode are placed very close to each other. The distance between them could be on the order of 100 nanometers or less. The higher work function electrode will be the electron emitter and the lower work function electrode will be the electron collector. The space between the electron collector and electron emitter should be in vacuum or at a very low pressure.

The electron emitter and the electron collector are connected peripherally by a wire. A load resistance is connected along the wire. The load resistance can be any device in need of electric power to function. As noted in the description of a thermionic energy converter, conduction electrons will spontaneously flow out of the lower work function electron collector through the wire, through the load resistance, and continue by wire into the higher work function electron emitter.

The driving mechanism for the spontaneous electron flow is what creates the voltage in this disclosure as well as in the thermionic energy converter. The mechanism can be seen when any two conducting or semiconducting materials with different work functions are brought together. At the interface between two metals, for example, conduction electrons move freely between the two materials. However, the number of electrons crossing the interface over time is not equal in both directions. Electrons will tend to stay in the higher work function material because lattice ions there provide a greater amount of electron screening than is provided by lattice ions in the material having the lower work function so that conduction electrons don't interact with each other as strongly and can gather more densely in the higher work function material. As in all spontaneous physical processes, the movement of electrons into the higher work function electron emitter is marked by an increase in entropy for the electrons that have traveled from the lower work function material of the electron collector.

The electrons that flowed from the electron collector, through wires and the load resistance arrive at the electron emitter. Electrons build up in the electron emitter, creating an electric potential difference between the electron emitter and the very nearby electron collector (see e.g. A. J. Dekker in "Solid State Physics" page 230) and therefore creating an electric field between the electron emitter and electron collector.

In order for a continuous current to flow in the present disclosure, free electrons in the electron emitter must move across the small gap to the electron collector, completing a circuit. The gap could be substantially in vacuum or contain a low pressure gas. The gap could also contain a material that allows ballistic transport of electrons. The release of electrons from the electron emitter will be accomplished through the impetus of the electric field described above, without adding heat at the emitter.

The electron emitter and electron collector are placed so close together that the electric field between them can be very intense. If the work function difference between the electron emitter and the electron collector is one electron volt then the electric potential difference would be one volt. If the electron emitter and electron collector are shaped to present flat surfaces toward each other and are 0.1 microns apart, a one volt electric potential difference would cause an electric field between the emitter and the collector that would have a strength of 10 volts per micron (diminished by the Schottky effect). This electric field strength is enough to alter the electric field barrier at the surface of the electron emitter that holds free electrons within the electron emitter. The surface barrier becomes thinner (see e.g. A. J. Dekker in "Solid State Physics" page 230).

The thin surface barrier allows conduction electrons within the electron emitter to undergo quantum mechanical tunneling through the surface barrier. The tunneling through the barrier constitutes electron field emission. The emitted electrons are then drawn by the electric field to cross to the electron collector and complete the circuit, allowing a continuous electric current to flow through the load resistance, making this disclosure a continuous electric power source.

The number of electrons that are emitted and cross to the electron collector depends on the strength of the electric field between the electron emitter and the electron collector. The electric field strength can be increased by placing the emitter and collector closer together. Alternatively, the strength of the electric field at the emitting surface of the electron emitter can be increased by shaping the electron emitter so that the emitting surface facing the electron collector has a small radius of curvature. The electron emitter could be shaped so as to face the electron collector with a sharp point or a thin edge. The emitter or group of emitters could also be nanorods.

Materials with different work functions also have different Fermi energies. Electrons moving between two different materials in contact must gain or lose kinetic energy in order to cross the interface between materials. Electrons gain or lose kinetic energy by taking heat from the lattice or giving heat to the lattice. Considering materials that have significantly different work functions and could be used as the electron emitter and the electron collector in the present disclosure, the electron emitter with its higher work function would have a Fermi energy that would be higher than the Fermi energy of the electron collector. As electrons move from the electron collector, through wires, through a load resistance and into the electron emitter, the electrons must gain or lose kinetic energy as they enter each new material at the Fermi energy of that material. The net result is that each electron that starts a journey in the electron collector and ends in the electron emitter will have, on average, drawn heat energy from the materials it passed through. The heat is the energy source that allows a difference in work functions to drive a current in the disclosure. Heat drawn from the interfaces between materials in a thermionic energy converter is also the energy source for that electric power source.

The heat that the device of this disclosure gathers at the junctions between different materials can come from any source. While this disclosure is intended to operate by taking heat from the local environment, which ultimately comes from the sun, the heat could come from such sources as fossil fuels, nuclear or geothermal. The heat could also come from an engineered gathering of solar energy as with lenses or mirrors or dark colored absorbers.

At extremely low temperatures there would be very little heat available for conduction electrons to gain enough kinetic energy to move from a low Fermi energy electron collector to a higher Fermi energy electron emitter. At such low temperatures, zero point energy would be the energy source that would allow electrons to enter the electron emitter.

A material for the electron emitter would be chosen from a group with relatively high work functions. Some examples of materials that the electron emitter could be made of or coated with are: carbon, carbon nitride, tungsten, tantalum, molybdenum, rhenium, osmium, platinum, nickel, silicon, doped silicon, or a mixture thereof.

There are also many choices of material for the electron collector. Some examples of materials with relatively low work functions that the electron collector could be made of or coated with are: lanthanum, lanthanum hexaboride, cerium, cerium hexaboride, barium, barium carbonate, barium oxide, cesium, silicon, doped silicon, or a mixture thereof.

As with any other direct current power source, such as a chemical battery, individual examples of the present disclosure can be connected in parallel to provide a higher electric current in a circuit.

Additionally, while the heat energy taken in at the junctions between higher and lower work function materials allows this disclosure to function, it also cools the junctions between materials and anything near the junctions, allowing this disclosure to function as a cooling device.

While this disclosure is intended to describe a power source that doesn't require a heated electron emitter, a heat source near the electron emitter would raise the kinetic energy of some free electrons in the electron emitter and would increase the rate of electron field emission.

The foregoing description is illustrative only and is not intended to be in any way limiting. In addition to the illustrative aspects, embodiments, and features described above, further aspects, embodiments, and features will become apparent by reference to the drawings and the following detailed description.

REFERENCE NUMERALS IN DRAWINGS 11 electron emitter
12 electron collector
13 load resistance
14 emitter wire
15 collector wire
16 pointed electron emitter
17 pointed electron emitter base
18 nanotube emitter
19 nanotube emitter base
20 long electron emitter
21 long electron collector
22 substrate
23 raised electron emitter
24 raised electron collector
25 emitter spacer
26 collector spacer
27 heat source

DETAILED DESCRIPTIONS OF FIGURES

Figure 1:
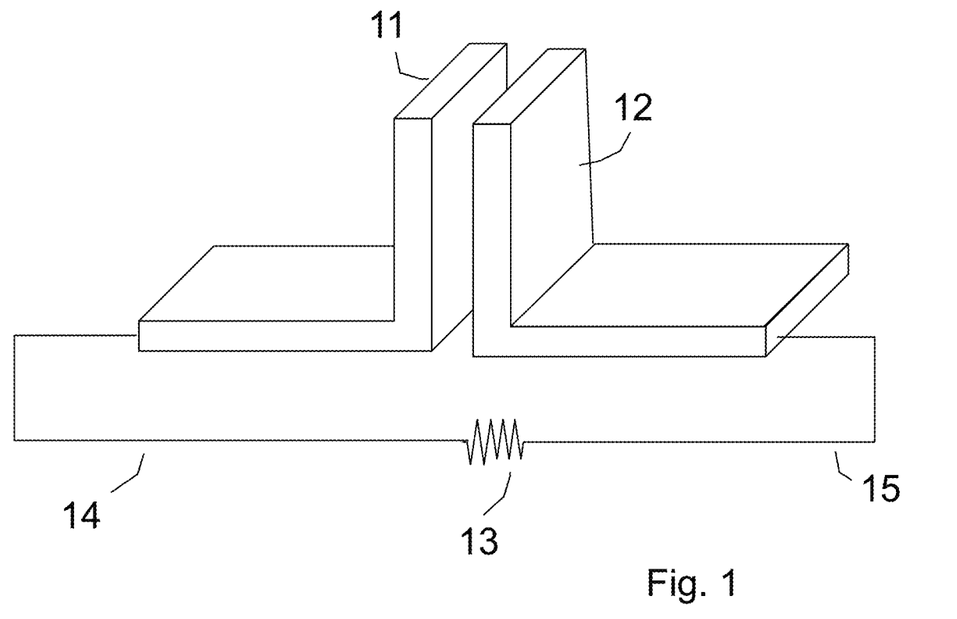
FIG. 1 illustrates a perspective drawing of an embodiment of the disclosure with flat, close spaced electron emitter and electron collector.

FIG. 1 shows an electron emitter 11 facing an electron collector 12. The surface material of electron emitter 11 has a higher work function than the surface material of electron collector 12. Electron emitter 11 is connected by an emitter wire 14 to a load resistance 13. Load resistance 13 can be any device that requires electric power. Electron collector 12 is connected by a collector wire 15 to load resistance 13 resulting in an electrical connection between electron emitter 11 and electron collector 12. The electrical connection between electron emitter 11 and electron collector 12 allows electrons to spontaneously flow, due to the difference in work functions, from electron collector 12 to electron emitter 11 creating an electric field between electron emitter 11 and electron collector 12. The electric field created between electron emitter 11 and electron collector 12 causes field emission of electrons from electron emitter 11. The emitted electrons cross the small vacuum gap to electron collector 12, completing the electric circuit. The complete circuit allows a continuous current to flow and provide electric power to load resistance 13.

Figure 2:
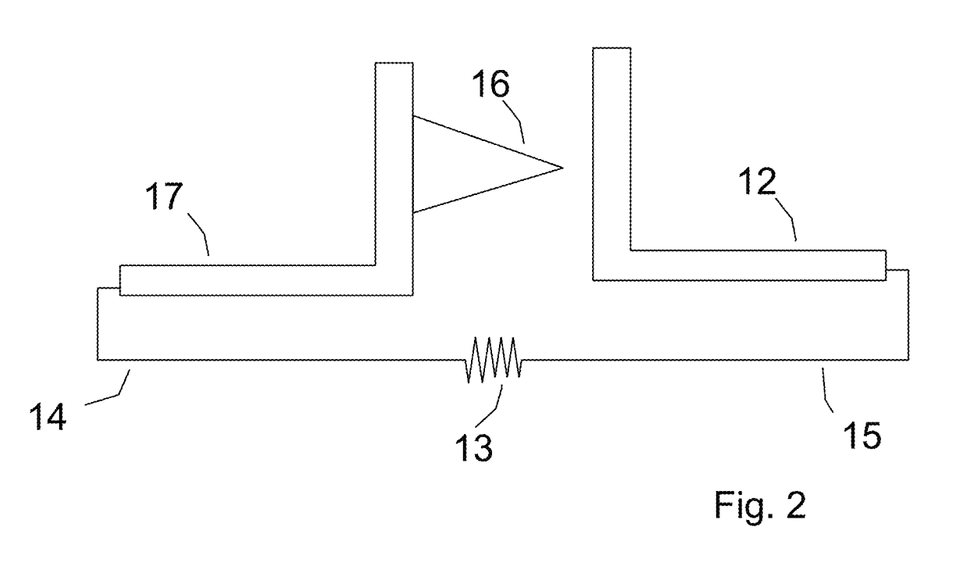
FIG. 2 illustrates a schematic drawing of an embodiment of the disclosure in which the electron emitter has a sharp point.

FIG. 2 is a cutaway view that shows a pointed electron emitter 16 facing electron collector 12. Pointed electron emitter 16 is composed of a material that, at the surface of the sharp tip, has a higher work function than the surface material of electron collector 12. Pointed electron emitter 16 is held in place by a pointed electron emitter base 17. Pointed electron emitter base 17 is made of a material that will conduct electricity and is connected by emitter wire 14 to load resistance 13. Load resistance 13 can be any device that requires electric power. Electron collector 12 is connected by collector wire 15 to load resistance 13 resulting in an electrical connection between electron collector 12 and pointed electron emitter 16. The electrical connection between electron collector 12 and pointed electron emitter 16 allows electrons to spontaneously flow, due to the difference in work functions, from electron collector 12 to pointed electron emitter 16 creating an electric field between electron collector 12 and pointed electron emitter 16. The tip of pointed electron emitter 16 has a small radius of curvature which causes an enhancement of the electric field strength. The electric field strength at the tip of pointed electron emitter 16 would be greater than that at the flat emitting surface of electron emitter 11 of FIG. 1. The electric field created between pointed electron emitter 16 and electron collector 12 causes field emission of electrons from pointed electron emitter 16. The emitted electrons cross the small vacuum gap to electron collector 12, completing the electric circuit. The complete circuit allows a continuous current to flow and provides electric power to load resistance 13.

Figure 3:
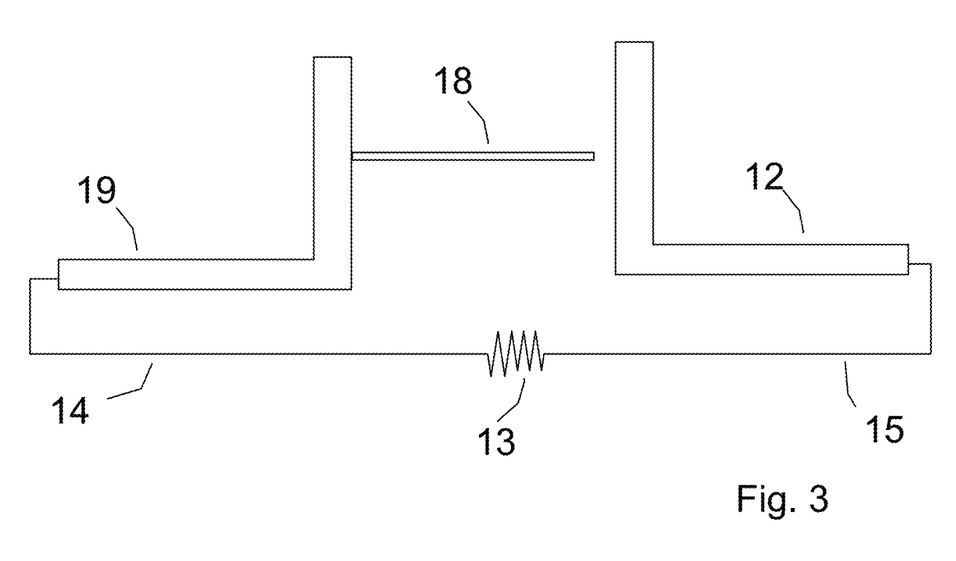
FIG. 3 illustrates a schematic drawing of an embodiment of the disclosure in which the electron emitter is a nanorod.

FIG. 3 is a cutaway view that shows a nanotube emitter 18 facing electron collector 12. Nanotube emitter 18 is composed of a material that has a higher work function than the material of electron collector 12. Nanotube emitter 18 is held in place by a nanotube emitter base 19. Nanotube emitter base 19 is composed of a material that will conduct electricity and is connected by emitter wire 14 to load resistance 13. Load resistance 13 can be any device that requires electric power. Electron collector 12 is connected by collector wire 15 to load resistance 13 resulting in an electrical connection between electron collector 12 and nanotube emitter 18. The electrical connection between electron collector 12 and nanotube 18 allows electrons to spontaneously flow, due to the difference in work functions, from electron collector 12 to nanotube emitter 18 creating an electric field between electron collector 12 and nanotube emitter 18. The tip of nanotube emitter 18 facing electron collector 12 has a small radius of curvature which causes an enhancement of the electric field strength. The electric field strength at the tip of nanotube emitter 18 would be greater than that at the flat emitting surface of electron emitter 11 of FIG. 1. The electric field created between nanotube emitter 18 and electron collector 12 causes field emission of electrons from nanotube emitter 18. The emitted electrons cross the small vacuum gap to electron collector 12, completing the electric circuit. The complete circuit allows a continuous current to flow and provides electric power to load resistance 13.

Figure 4:
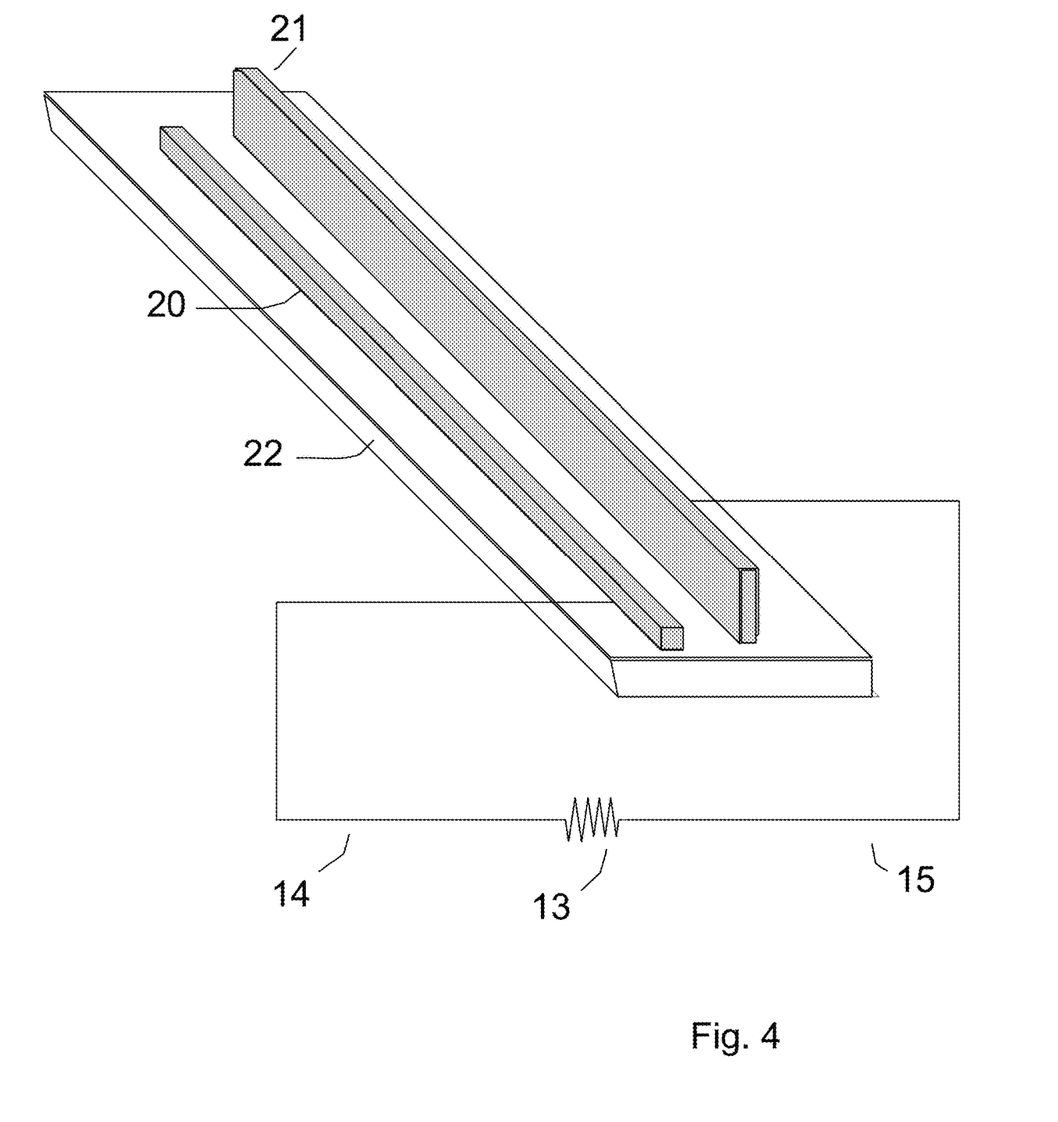
FIG. 4 illustrates a perspective drawing of an embodiment of the disclosure in which the electron emitter and the electron collector are in the shape of rectangular solids on a substrate.

In FIG. 4, a long electron emitter 20 sits on a substrate 22. Substrate 22 is composed of an insulating material. A long electron collector 21 sits on substrate 22 and faces long electron emitter 20. Long electron emitter 20 is composed of a material that at has a higher work function at its surface than the material at the surface of long electron collector 21. Long electron emitter 20 is connected by emitter wire 14 to load resistance 13. Load resistance 13 can be any device that requires electric power. Long electron collector 21 is connected by collector wire 15 to load resistance 13 resulting in an electrical connection between long electron collector 21 and long electron emitter 20. The electrical connection between long electron collector 21 and long electron emitter 20 allows electrons to spontaneously flow, due to the difference in work functions, from long electron collector 21 to long electron emitter 20, creating an electric field between long electron collector 21 and long electron emitter 20. The edges of long electron emitter 20 have a small radius of curvature, which causes an enhancement of the electric field strength along the length of each edge of long electron emitter 20 with respect to the flat surfaces of long electron emitter 20. The electric field created between long electron emitter 20 and long electron collector 21 causes field emission, principally from the edges of long electron emitter 20. The emitted electrons cross the small vacuum gap to long electron collector 21, completing the electric circuit. The complete circuit allows a continuous current to flow and provides electric power to load resistance 13.

Figure 5:
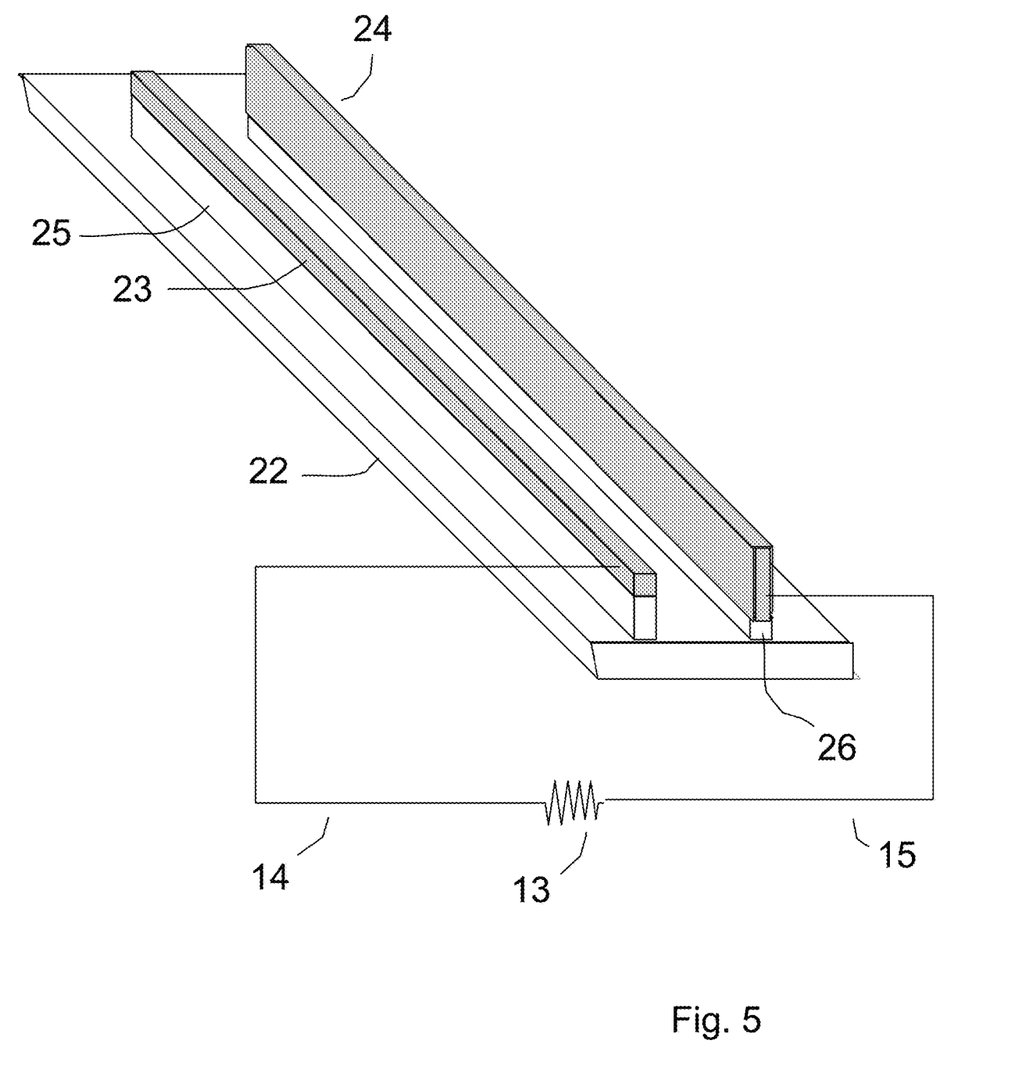
FIG. 5 illustrates a perspective drawing of an embodiment of the disclosure in which the electron emitter and the electron collector are in the shape of rectangular solids that are held above a substrate by spacers.

FIG. 5 shows an electric power source in which a raised electron emitter 23 faces a raised electron collector 24. Raised electron emitter 23 sits on an emitter spacer 25. Raised electron collector 24 sits on a collector spacer 26. Emitter spacer 25 and collector spacer 26 sit on substrate 22. Emitter spacer 25 and collector spacer 26 are composed of an insulating material. Substrate 22 is composed of an insulating material.

The surface of raised electron emitter 23 is composed of a material that has a higher work function than the material that composes the surface of raised electron collector 24. Raised electron emitter 23 is connected by emitter wire 14 to load resistance 13. Load resistance 13 can be any device that requires electric power. Raised electron collector 24 is connected by collector wire 15 to load resistance 13 resulting in an electrical connection between raised electron collector 24 and raised electron emitter 23. The electrical connection between raised electron collector 24 and raised electron emitter 23 allows electrons to spontaneously flow, due to the difference in work functions, from raised electron collector 24 to raised electron emitter 23, creating an electric field between raised electron collector 24 and raised electron emitter 23. The edges of raised electron emitter 23 have a small radius of curvature, which causes an enhancement of the electric field strength along the length of each edge of raised electron emitter 23 with respect to the flat surfaces of raised electron collector 23. The electric field created between raised electron emitter 23 and raised electron collector 24 causes field emission, principally from the edges of raised electron emitter 23. The emitted electrons cross the small vacuum gap to raised electron collector 24, completing the electric circuit. The complete circuit allows a continuous current to flow and provides electric power to load resistance 13.

Figure 6:
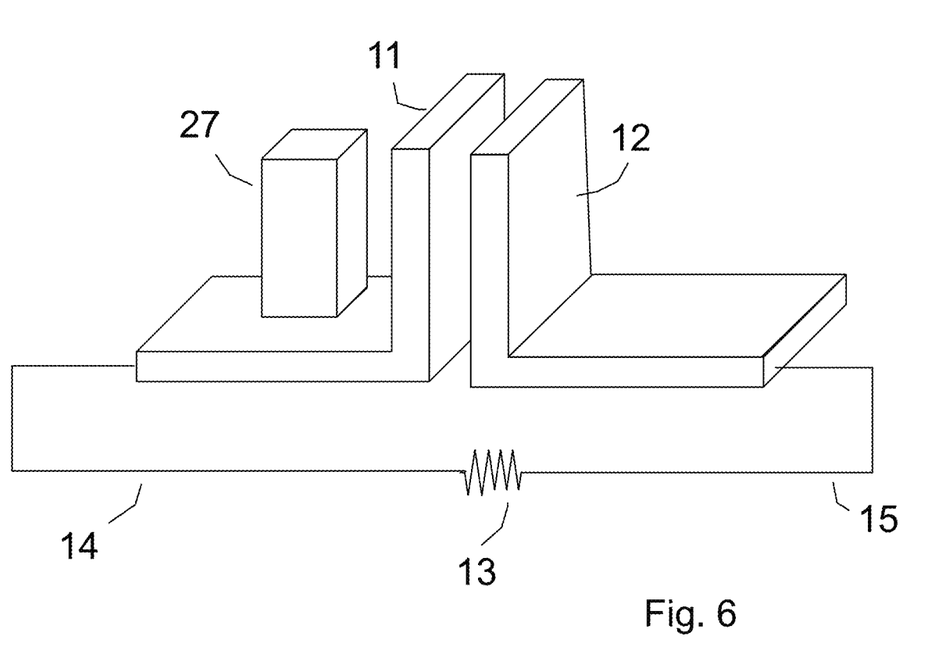
FIG. 6 illustrates a perspective drawing of an embodiment of the disclosure with a heat source.

FIG. 6 shows electron emitter 11 facing electron collector 12. The surface material of electron emitter 11 has a higher work function than the surface material of electron collector 12. A heat source 27 is positioned near electron emitter 11, raising the temperature of electron emitter 11. Electron emitter 11 is connected by emitter wire 14 to load resistance 13. Load resistance 13 can be any device that requires electric power. Electron collector 12 is connected by collector wire 15 to load resistance 13 resulting in an electrical connection between electron emitter 11 and electron collector 12. The electrical connection between electron emitter 11 and electron collector 12 allows electrons to spontaneously flow, due to the difference in work functions, from electron collector 12 to electron emitter 11 creating an electric field between electron emitter 11 and electron collector 12. The electric field created between electron emitter 11 and electron collector 12, aided by heat added to electron emitter 11 by heat source 27, causes field emission of electrons from electron emitter 11. The emitted electrons cross the small vacuum gap to electron collector 12, completing the electric circuit. The complete circuit allows a continuous current to flow and provide electric power to load resistance 13.

I claim:

1. A device for producing electrical energy comprising:
   (a) an electron emitter composed of or coated with a material having a first work function, the electron emitter having no heater thermally connected to the electron emitter;
   (b) an electron collector composed of or coated with a material having a second work function that is lower than the first work function, the electron collector being spaced from the electron emitter by a distance that reduces an emitter surface barrier sufficiently to allow electron field emission tunneling through the emitter surface barrier, the spaced distance being 100 nanometers or less; and
   (c) a load resistance conductively connected between the electron emitter and the electron collector.

2. A device for producing electrical energy according to claim 1 in which the electron emitter is shaped in such a way that a surface or surfaces of the electron emitter that are substantially close to the electron collector have a substantially small radius of curvature so as to substantially increase electric field strength at said surface or surfaces.

3. A device for producing electrical energy as in claim 2 in which the electron emitter having the substantially small radius of curvature is a narrow point.

4. A device for producing electrical energy as in claim 2 in which the electron emitter having the substantially small radius of curvature is a nanorod.

5. A device for producing electrical energy as in claim 2 in which the electron emitter having the substantially small radius of curvature is an edge formed as two surfaces come together at an angle.

6. A device for producing electrical energy as in claim 1 in which a substrate and supporting structure includes a material chosen from a dielectric, an electrical insulator, a ceramic, silicon oxide, silicon dioxide, silicon nitride, and aluminum oxide.

7. A device for producing electrical energy as in claim 1 in which the electron emitter or a surface of the electron emitter comprises carbon, carbon nitride, tungsten, tantalum, molybdenum, rhenium, osmium, platinum, nickel, silicon, doped silicon, or a mixture thereof.

8. A device for producing electrical energy as in claim 1 in which the electron collector or a surface of the electron collector comprises lanthanum, lanthanum hexaboride, cerium, cerium hexaboride, barium, barium carbonate, barium oxide, cesium, silicon, doped silicon, or a mixture thereof.

9. A device for producing electrical energy as in claim 1 in which a space between the electron emitter and the electron collector is at a substantially low pressure or comprises a material that allows electrons to travel substantially ballistically from the electron emitter to the electron collector.

10. A device for producing electrical energy as in claim 1 in which a heat source that allows electrons to move from a lower work function electron collector to a higher work function electron emitter is a local environment, burning fossil fuels, solar, geothermal or nuclear.

11. A device for producing electrical energy as in claim 1 in which an energy source that allows electrons to move from a lower work function electron collector to a higher work function electron emitter is zero point energy.

* * * * *